(12) United States Patent
Anton et al.

(10) Patent No.: US 8,562,124 B2
(45) Date of Patent: Oct. 22, 2013

(54) SELF-DISPERSING PIGMENT DISPERSIONS AND INK JET INKS CONTAINING THEM

(75) Inventors: Waifong L. Anton, Wilmington, DE (US); Anthony W. Kluth, Villanova, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 175 days.

(21) Appl. No.: 13/320,810

(22) PCT Filed: Jul. 14, 2010

(86) PCT No.: PCT/US2010/041925
§ 371 (c)(1),
(2), (4) Date: Nov. 16, 2011

(87) PCT Pub. No.: WO2011/011233
PCT Pub. Date: Jan. 27, 2011

(65) Prior Publication Data
US 2012/0075369 A1    Mar. 29, 2012

Related U.S. Application Data

(60) Provisional application No. 61/228,331, filed on Jul. 24, 2009, provisional application No. 61/250,284, filed on Oct. 9, 2009.

(51) Int. Cl.
*G01D 11/00*    (2006.01)
*C09D 11/02*    (2006.01)

(52) U.S. Cl.
USPC .......................................... 347/100; 106/31.6

(58) Field of Classification Search
CPC ....... C09D 11/326; C09D 11/40; C09D 11/54
USPC ................................ 347/9, 98–100; 106/31.6
See application file for complete search history.

(56) References Cited

U.S. PATENT DOCUMENTS

| | | |
|---|---|---|
| 4,490,728 A | 12/1984 | Vaught et al. |
| 6,005,023 A | 12/1999 | Anton et al. |
| 6,040,358 A | 3/2000 | Page et al. |
| 6,387,168 B1 * | 5/2002 | Koitabashi et al. .......... 106/31.6 |
| 6,648,463 B2 | 11/2003 | Koga et al. |
| 6,852,156 B2 * | 2/2005 | Yeh et al. ..................... 106/31.6 |
| 2002/0014184 A1 | 2/2002 | Yeh et al. |
| 2004/0109816 A1 | 6/2004 | Srinivas et al. |
| 2005/0204957 A1 | 9/2005 | Momose et al. |

FOREIGN PATENT DOCUMENTS

| | | |
|---|---|---|
| EP | 0805191 A2 | 11/1997 |
| EP | 0896986 A1 | 2/1999 |
| EP | 0851014 B1 | 7/2002 |
| EP | 0974607 B1 | 9/2004 |
| WO | WO 01/94476 A2 | 12/2001 |
| WO | WO 03/104340 A1 | 12/2003 |
| WO | WO 2004/104119 A1 | 12/2004 |
| WO | WO 2008/130601 A1 | 10/2008 |

* cited by examiner

*Primary Examiner* — An Do
(74) *Attorney, Agent, or Firm* — Simon L. Xu

(57) ABSTRACT

The disclosure provides a self dispersing pigment dispersion for use in inks including a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second. Ink jet inks containing these self-dispersing pigments, are also provided.

20 Claims, No Drawings

SELF-DISPERSING PIGMENT DISPERSIONS AND INK JET INKS CONTAINING THEM

BACKGROUND OF THE DISCLOSURE

This disclosure relates to self-dispersing pigment dispersions and particularly to their use in ink jet inks.

Aqueous dispersions of pigments are known in the art and have been used in various applications, such as, inks for printing (particularly ink jet printing); waterborne paints and other coating formulations for vehicles, buildings, road markings and the like; cosmetics; pharmaceutical preparations; etc. Because pigments are typically not soluble in an aqueous vehicle, use of dispersing agents is often required, such as, polymeric dispersants or surfactants, to produce a stable dispersion of the pigment in the vehicle.

The use of dispersing agents, however, increases the viscosity of the dispersion over what it would be without the dispersing agents. The increase in viscosity, while not particularly a problem for some uses, presents a significant disadvantage in others. For example, viscosity limitations on the end use application of the dispersion (e.g., ink jet inks) may be exceeded if binders are added to improve properties of the final product. Thus, the viscosity of the dispersion itself will reduce the formulation latitude for final products.

Further because pigments are typically insoluble particulates, they have a propensity to settle if stored undisturbed for extended periods of time. Upon settling, these particles can cause clogging of nozzles and poor print quality. The recovery of these nozzles and print quality may be achieved by using printer-driven cleaning procedures. Alternately, they may require human intervention whereby the print cartridge is removed from the printer and vacuum applied to re-prime the print cartridge. Such servicing routines to recover print quality after storage are inconvenient and increase the cost of operation because of the loss of ink from the print cartridge. The severity of clogging and the subsequent ease of recovery of print quality are found to correlate to the ease with which pigments in the dispersion pack in proximity with each other. Easier packing of pigments leads to faster rate of increase of pigment density at the nozzle orifices during periods of no printing wherein the pens are stored with the nozzles facing downwards as is the normal configuration in a printer. Therefore, the faster the pigment densification rate, the more severe clogging of the nozzle orifices and the recovery of print quality is more difficult.

A need exists for ink jet inks to jet with ease and reliability after extended storage in the pen.

SUMMARY OF THE DISCLOSURE

In a first aspect, the disclosure provides a self dispersing pigment dispersion for use in inks, typically ink jet inks, comprising a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second. By 'stabilizing group' we mean an anionic group covalently bonded to the pigment surface that assists in the dispersion of the pigment in aqueous systems comprising water. More typically the pigment has an oil absorption of at least about 160 to about 170 mL/100 g, and most typically about 160 to about 165 mL/100 g. Typically the pigment has an acid content of about 0.98 to about 3.0 microequivalent/$m^2$, more typically 0.98 to about 2.0 microequivalent/$m^2$, and most typically about 0.98 to about 1.5 microequivalent/$m^2$. The self dispersing pigment dispersion wherein the stabilizing group, more typically a carboxylic acid group, covalently attached to the pigment surface of the pigment, more typically a carbon black pigment, is obtained by oxidizing the pigment with ozone.

In a second aspect, the disclosure provides an ink comprising an aqueous carrier medium and a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second. Typically, the ink is an aqueous ink jet ink.

In a third aspect, the disclosure provides method of ink jet printing onto a substrate comprising, in any workable order, the steps of:
(a) providing an ink jet printer that is responsive to digital data signals;
(b) loading the printer with a substrate to be printed;
(c) loading the printer with an aqueous ink jet ink comprising an aqueous carrier medium and a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second; and
(d) printing onto the substrate using the aqueous ink jet ink, in response to the digital data signals to form a printed image on the substrate.

In a fourth aspect, the disclosure provides a printer comprising an ink jet ink, wherein the ink jet ink comprises an aqueous carrier medium and a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second.

These ink jet inks jet with ease and reliability upon extended storage in the pen.

DETAILED DESCRIPTION OF THE DISCLOSURE

The present disclosure provides self-dispersing pigment dispersions with a low pigment densification rate for good recovery of nozzle firing even with extended storage in the pen. The term "self-dispersing" as it is generally understood in the art and used here, means a pigment having stabilizing groups, more typically carboxylic acid groups, covalently attached to the surface of the pigment particles such that the pigment forms a stable aqueous dispersion in the absence of any additional dispersing agents. The self dispersing pigment dispersion comprises a pigment having a stabilizing group covalently attached to the pigment surface, and having an oil adsorption of at least about 155 to about 179 mL/100 g, and an acid content of at least about 0.98 microequivalent/$m^2$, and wherein the pigment dispersion has a pigment densification rate of less than about 8.40 E-04 mL/second. By 'stabilizing group' we mean an anionic group covalently bonded to the pigment surface that assists in the dispersion of the pigment in aqueous systems comprising water. Some examples of stabilizing groups include —COOM, —SO$_3$M, —PO$_3$M$_2$, —SO$_2$NH$_2$, wherein M is H, alkaline metal such as Na, K, Ca, etc., ammonium or organic ammonium such as mono-, di- and tri-methyl, -ethyl or -methanol ammonium. More typically the stabilizing group is —COOM wherein M is H, alkaline metal such as Na, K, Ca, etc., ammonium or organic ammonium such as mono-, di- and tri-methyl, -ethyl, or -methanol ammonium. Most typically, the stabilizing group is —COOM, wherein M is an alkaline metal.

Self Dispersing Pigment Dispersion

The self dispersing pigment dispersion comprises water, a pigment, typically a carbon black pigment, having an oxidized surface and optionally additives. To oxidize the surface of the pigment, the following methods can be used: (a) an oxidation method using contact with air;
(b) a gas phase oxidation method using reaction with a nitrogen oxide or ozone; and
(c) a liquid phase oxidation method using an oxidizing agent such as nitric acid, potassium permanganate, potassium dichromate, chlorous acid, perchloric acid, a hypohalite, hydrogen peroxide, a bromine aqueous solution or an ozone aqueous solution; etc. The surface may also be modified through plasma treatment or the like.

In one embodiment, the process utilized for preparing the self-dispersing pigment is by oxidizing the pigment with ozone in an aqueous environment, typically de-ionized water, while simultaneously subjecting the pigment to at least one dispersive mixing operation. This process is described in U.S. Pat. No. 6,852,156. Oxidation is carried out until the surface of the pigment is found to have an oil adsorption of at least about 155 to about 179 mL/100 g, and an acid content of at least about 0.98 microequivalent/m$^2$. The length of time needed for the oxidation step to obtain a pigment with the desired properties is dependant on the type of equipment used and the process used for oxidizing the pigment. The length of time needed to obtain the desired amount of acid moieties can be determined by taking samples at time intervals and titrating for the acid content per the procedure described herein. In this oxidation process, an ozone generator generates ozone from compressed oxygen or air fed into a feed tank and delivers the ozone to a pre-mix tank. Water and pigment are also delivered to the pre-mix tank via water supply and pigment supply. The order in which the pigment, water, and ozone are introduced into the pre-mix tank is not particularly important, so long as the water is added before the ozone.

The reactants are agitated in the pre-mix tank via a high speed disperser (referred to herein as "HSD"). The pre-mix tank has a vent to atmosphere with an ozone destruction device. To aid with the agitation and increase the process efficiency it is generally preferred to introduce the ozone in a manner that produces more and smaller bubbles as opposed to fewer and larger bubbles.

Physical property and composition of pigments are important factors to attain a high quality performance of ink jet inks and coatings. In the present disclosure, the types of pigments to be used are not particularly limited in the properties of primary particle size and surface area. For the ink jet ink application, it is typical to use pigments having a primary particle size of less than 30 nm. Surface area measured by BET method affects significantly the operating conditions to attain self-dispersing pigments. The higher the pigment surface area is, the longer the cycle time is usually needed.

Typical color pigments that can be used in the process of this disclosure to form self dispersing pigments are blue pigments, red pigments, green pigments, and yellow pigments.

As noted above, it is typical or required, depending on the embodiment, to subject the mixture of water, ozone and pigment to at least one dispersive mixing step. Most of mixing or stirring applications involve pumping and mass flow of liquid, liquid-solid, or liquid-gas. The intensity of mixing can be characterized by the energy input or the effective shear rate. The effective shear rate for mixing usually ranges from 50 to 200 sec$^{-1}$ (James Y. Oldshue, "Fluid Mixing Technology," p. 29, 1983) and from 200 to 20,000 sec$^{-1}$ for dispersive mixing or dispersion (Temple C. Patton, "Paint Flow and Pigment Dispersion," p. 356, 1979). Accordingly, the term "dispersive mixing" is used herein to identify a mixing operation that provides an effective shear rate of at least 200 sec$^{-1}$. Such well known devices as a media mill, attritor, hammer mill, Microfluidizer® (commercially available from Microfluidics Corp), homogenizer, jet mill, fluid mill and similar high energy dispersing devices can be used to advantage in the present disclosure.

The reactants are transferred via a pump from the pre-mix tank into a dispersive mixing apparatus. The type of device used for the dispersive mixing step will depend, to some extent, on the type of pigment being oxidized and all the characteristics of the pigment. In general, color pigments need higher energy mixing as compared to the carbon black pigments. The preceding statement is not meant to imply that the process will not work unless the proper mixing device is selected, but rather to note that more than one dispersive mixing step may be needed if the selected device lacks sufficient energy. In general, it has been found that media milling and passing through a plurality of nozzles within a liquid jet interaction chamber at a liquid pressure of at least 1000 psi, i.e., such as would occur in a Microfluidizer®, work well in the process and are most typical.

After the oxidation and dispersive mixing step, the pigment mixture is typically purified. In the purification procedure, salts are removed from the pigment mixture (referred to herein as "desalination") and the mixture is filtered. The desalination process is typically performed by ultrafiltration.

The concentration of pigment that can be used in the process is not particularly critical and is more a function of the type of pigment and the type of equipment used in the process than it is a limitation on the process itself. Generally speaking, however, the maximum amount of pigment should not exceed 50 wt %. A pigment concentration of 5-20 wt %, especially about 10 wt %, is preferred for process efficiency.

The pigment dispersion of this disclosure has a pigment densification rate, measured as described in the examples, of less than about 8.40 E-04 mL/second, more typically less than about 7.80 E-04 mL/second.

Method for Determination of Acid Content of Pigment:

The acid content of the pigment can be determined by the following procedure: A known weight of the pigment dispersion comprising about 0.5000 gram pigment solid was diluted with 60 g of deionized water. Aqueous potassium hydroxide solution was added to adjust pH to 12. The sample was then titrated with analytical grade of 0.5N hydrochloric acid using an automated titrator equipped with a pH sensor and computer program (TIM 860 Autotitrator with ABU52 unit and Titramaster 85 software). The molar amount of acid consumed between the two computer-generated inflection points equals the moles of acid in the pigment dispersion sample.

Oil Absorption Measurement:

DBP oil absorption is the amount of oil absorption using dibutyl phthalate, typically, as described in ASTM D3493.

Ink Jet Inks

The self-dispersing pigment dispersions of this disclosure are particularly well suited for use in inks, typically ink jet inks, more typically aqueous ink jet inks. Accordingly, in one embodiment, the present disclosure provides such inks. Typically, aqueous ink jet inks comprise an aqueous vehicle, typically referred to as an aqueous carrier medium, a colorant and various additives. The additives are selected to provide the ink with a desired property or effect, such as might be needed to adapt the ink to the requirements of a particular ink jet printer or to provide, for example, a balance of light stability, smear resistance, viscosity, surface tension, optical density, adhesion, or crust resistance.

Aqueous Carrier Medium

The aqueous carrier medium is water or a mixture of water and at least one water-soluble or water-miscible (collectively referred to as "water-soluble") organic solvent. Selection of a suitable mixture depends on requirements of the specific application, such as, desired surface tension and viscosity, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is typical as the aqueous carrier medium.

If a mixture of water and a water-soluble solvent is used, the aqueous carrier medium usually contains from about 30% to about 95% water with the balance (i.e., 70 to 5%) being the water-soluble solvent. Typically, the aqueous carrier medium is 60-95%, most typically 85 to 95%, by weight, water. The aqueous carrier medium comprises 70 to 99.8%, by weight of the total ink composition, most typically 90 to 99% by weight.

Additives

The ink may contain other additives that are commonly used in ink jet inks. For example, surfactants may be used to alter surface tension as well as maximize penetration of the ink into the print media. However, surfactants may have a negative effect on the stability of the pigment in the ink, so care should be taken in selecting the proper surfactant. In addition, the choice of a specific surfactant is highly dependent on the type of media substrate to be printed. In aqueous inks, the surfactants may be present in the amount of 0.01 to 5% and preferably 0.2 to 2%, based on the total weight of the ink.

Biocides, such as, Dowicides® (commercially available from Dow Chemical, Midland, Mich.), Nuosept® (commercially available from Huls America, Inc., Piscataway, N.J.), Omidines® (commercially available from Olin Corp., Cheshire, Conn.), Nopcocides® (commercially available from Henkel Corp., Ambler, Pa.), Troysans® (commercially available from Troy Chemical Corp., Newark, N.J.) and sodium benzoate may be used in the ink compositions to inhibit growth of microorganisms. Sequestering agents such as EDTA may also be included to eliminate deleterious effects of heavy metal impurities. Other known additives, such as humectants, viscosity modifiers and the like may also be added to improve various properties of the ink compositions.

One of the main advantages of using self-dispersing pigments is that the inks have very low viscosity which, in turn, permits the addition of various additives to provide desirable properties to the printed image and for improved ink properties such as stability and drop formation. For example, it is known from the patent literature that certain types of polymer binders, when added to ink jet inks, can decrease the tendency of the ink to smear when, for example, printed text is struck with an office highlighter; can decrease the tendency of an ink to be washed off during laundering; can increase the adhesion of the ink to hydrophobic surfaces such as office transparencies and vinyl substrates; and can be used to improve the resistance of the printed ink to abrasion. See e.g., EP 0 974 607; U.S. Pat. No. 6,040,358; EP 0 851 014; U.S. Pat. Nos. 5,912,280 and 6,005,023. Therefore, it is most typical that the inks of the present disclosure contain one or more polymer binders to provide such useful properties.

Ink Preparation and Properties

The inks are prepared by mixing together the self-dispersing pigment or pigment dispersion of this disclosure, the aqueous vehicle, any additional colorants and any additives. If a conventional pigment is being used as an additional colorant, it will be necessary to prepare a dispersion of the pigment and the selected dispersant. The preparation of the dispersion is well known to those skilled in the art.

It is generally desirable to make these ink jet inks in concentrated form. The concentrated ink jet inks are subsequently diluted to the appropriate concentration for use in the ink jet printing system. This technique permits preparation of a greater quantity of ink from the equipment. Prior to use, the concentrate is then diluted to the desired concentration with appropriate solvents. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm. An acceptable viscosity is no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The ink and ink set may be used with a variety of ink jet printers such as continuous, piezoelectric drop-on-demand and thermal or bubble jet drop-on-demand. The inks of this disclosure have excellent storage stability for a long period and do not clog in an ink jet apparatus. In normal configuration of an ink jet printer, the pens are stored in such a manner that the nozzles are in the lowest position. Thus, when ink jet cartridges filled with the inks are stored in the printer for extended period of time pigment particles described in this disclosure do not settle. The nozzles of these cartridges are therefore not clogged and can readily re-start firing with little effort such as priming or servicing of the pens.

The inks of the present disclosure can be printed with any suitable ink jet printer, including printers equipped with piezo or thermal print heads. Some examples of thermal ink jet print heads are the Hewlett Packard Deskjet®, Officejet®, Photosmart® and Designjet® and CM8060® printers, Lexmark All-in-One printers, and Canon PIXMA® printers. Some examples of piezo print heads are Brother MFC3360C®, and Epson Stylus C120®. Some suitable printheads are disclosed in U.S. Pat. Nos. 4,490,728, and 6.648.463. The substrate can be any suitable substrate including plain paper, such as common electrophotographic copier paper and treated paper, such as photo-quality ink jet paper. The present disclosure is particularly advantageous for printing on plain paper.

Fixing the ink on the image recording material, such as, paper, fabric, film, etc., can be carried out rapidly and accurately. The printed ink images have clear color tones, high density, excellent water resistance and lightfastness.

EXAMPLES

The disclosure will now be further illustrated by, but not limited to, the following examples, in which parts and percentages are by weight unless otherwise noted. Unless otherwise stated, ozone was generated using ozone generator model GL-1 manufactured by PCI-WEDECO using either air or industrial grade oxygen as the feed gas. Particle sizes were determined using a Nanotrac® 150 model analyzer manufactured by Honeywell. Acid content and Oil absorption are measured as described earlier.

Pigment Dispersion 1

720 grams of FW-200 pigment from Evonik Degussa Corporation (Chester, Pa.), with a DBP oil absorption of 154 ml/100 gram, were loaded into an HSD vessel with 5280 grams of de-ionized water. The HSD speed was set to 1000 rpm during the ozone treatment. Ozone was maintained at a concentration of 6.8 to 7.5 wt % and was fed into the bottom of the HSD vessel at a flow rate of 4 liters per minute. Lithium hydroxide was added to the mixture in order to increase its pH to 7 after five hours of treatment. After adjusting pH, the mixture was then re-circulated through a Microfluidizer® M110F for six hours. Lithium hydroxide was periodically added to the mixture to maintain a pH between 6.5 and 7.5. Once the Microfluidization process was complete, ozone treatment in the HSD vessel at 700 rpm was continued for 2 hrs. The mixture was further purified by ultra-filtration. The resulting pigment had a surface acid content of 4.90 microequivalent per square meter.

Pigment Dispersion 2

508 grams of Raven® 2500 Ultra pigment from Columbia Chemicals (Marietta, Ga.), with a DBP oil absorption of 67 ml/100 gram, were loaded into an HSD vessel with 3725 grams of de-ionized water. The HSD speed was set to 750 rpm during the ozone treatment. Ozone was maintained at a concentration of 6 to 6.5 wt % and was fed into the bottom of the HSD vessel at a flow rate of 4 liters per minute. Lithium hydroxide was added to the mixture in order to increase its pH to 7 after five hours of treatment. After adjusting pH, the mixture was then re-circulated through a Microfluidizer® M110F for four hours. Lithium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 1.26 microequivalent per square meter.

Pigment Dispersion 3

750 grams of Nipex® 160IQ pigment from Evonik Degussa Corporation (Chester, Pa.), with a DBP oil absorption of 150 ml/100 gram, were loaded into an HSD vessel with 4250 grams of de-ionized water. The HSD speed was set to 1000 rpm during the ozone treatment. Ozone was maintained at a concentration of 6 to 6.5 wt % and was fed into the bottom of the HSD vessel at a flow rate of 4 liters per minute. Potassium hydroxide was added to the mixture in order to increase its pH to 7 after five hours of treatment. After adjusting pH, the mixture was then re-circulated through a Microfluidizer® M110F for eight hours. Potassium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 0.75 microequivalent per square meter.

Pigment Dispersion 4

750 grams of Nipex® 160IQ pigment from Evonik Degussa Corporation (Chester, Pa.), with a DBP oil absorption of 150 ml/100 gram, were loaded into an HSD vessel with 4250 grams of de-ionized water. The HSD speed was set to 1000 rpm during the ozone treatment. Ozone was maintained at a concentration of 6. to 6.5 wt % and was fed into the bottom of the HSD vessel at a flow rate of 4 liters per minute. Lithium hydroxide was added to the mixture in order to increase its pH to 7 after five hours of treatment. After adjusting pH, the mixture was then re-circulated through a Microfluidizer® M110F for four hours. Lithium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 0.87 microequivalent per square meter.

Pigment Dispersion 5

600 grams of Nipex® 180IQ pigment from Evonik Degussa Corporation (Chester, Pa.), with a DBP oil absorption of 160 ml/100 gram, were loaded into an HSD vessel with 4400 grams of de-ionized water. The HSD speed was set to 1000 rpm during the ozone treatment. Ozone was maintained at a concentration of 6. to 6.5 wt % and was fed into the bottom of the HSD vessel at a flow rate of 4 liters per minute. Potassium hydroxide was added to the mixture in order to increase its pH to 7 after five hours of treatment. After adjusting pH, the mixture was then re-circulated through a Microfluidizer® M110F for two hours. Potassium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 0.82 microequivalent per square meter.

Pigment Dispersion 6

600 grams of Nipex® 180IQ pigment from Evonik Degussa Corporation (Chester, Pa.), with a DBP oil absorption of 160 ml/100 gram, were loaded into an HSD vessel with 4400 grams of de-ionized water. The HSD speed was set to 1000 rpm during the ozone treatment. Ozone was maintained at a concentration of 6 to 6.5 wt % and was fed into the bottom of the HSD vessel at a flow rate of 4 liters per minute. Potassium hydroxide was added to the mixture in order to increase its pH to 7 after five hours of treatment. After adjusting pH, the mixture was then re-circulated through a Microfluidizer® M110F for six hours. Potassium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 0.95 microequivalent per square meter.

Pigment Dispersion 7

600 grams of Nipex® 180IQ pigment from Evonik Degussa Corporation (Chester, Pa.), with a DBP oil absorption of 160 ml/100 gram, were loaded into an HSD vessel with 4400 grams of de-ionized water. The HSD speed was set to 1000 rpm during the ozone treatment. Ozone was maintained at a concentration of 6 to 6.5 wt % and was fed into the bottom of the HSD vessel at a flow rate of 4 liters per minute. Potassium hydroxide was added to the mixture in order to increase its pH to 7 after five hours of treatment. After adjusting pH, the mixture was then re-circulated through a Microfluidizer® M110F for eight hours. Potassium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 1.05 microequivalent per square meter.

Pigment Dispersion 8

600 grams of Nipex® 180IQ pigment from Evonik Degussa Corporation (Chester, Pa.), with a DBP oil absorption of 160 ml/100 gram, were loaded into an HSD vessel with 4400 grams of de-ionized water. The HSD speed was set to 1000 rpm during the ozone treatment. Ozone was maintained at a concentration of 6 to 6.5 wt % and was fed into the bottom of the HSD vessel at a flow rate of 4 liters per minute. Potassium hydroxide was added to the mixture in order to increase its pH to 7 after five hours of treatment. After adjusting pH, the mixture was then re-circulated through a Microfluidizer® M110F for twelve hours. Potassium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 1.26 microequivalent per square meter.

Pigment Dispersion 9

720 grams of Nipex® 180IQ pigment from Evonik Degussa Corporation (Chester, Pa.), with a DBP oil absorption of 160 ml/100 gram, were loaded into an HSD vessel with 5280 grams of de-ionized water. The HSD speed was set to 1000 rpm during the ozone treatment. Ozone was maintained at a concentration of 6 to 6.5 wt % and was fed into the bottom of the HSD vessel at a flow rate of 4 liters per minute. Lithium hydroxide was added to the mixture in order to increase its pH to 7 after five hours of treatment. After adjusting pH, the mixture was then re-circulated through a Microfluidizer® M110F for eight hours. Lithium hydroxide was periodically added to the mixture to maintain a pH between 6.5 and 7.5. Once the Microfluidization process was complete, ozone treatment in the HSD vessel at 700 rpm was continued for 1 hr. The mixture was further purified by ultra-filtration. The resulting pigment had a surface acid content of 1.42 microequivalent per square meter.

TABLE 1

| | Average Particle Size | Acid Value (microequivalent per square meter) | DBP Oil Absorption (milliliters per 100 gram pigment) |
|---|---|---|---|
| Dispersion 1 | 91 nm | 4.90 | 154 |
| Dispersion 2 | 60 nm | 1.26 | 67 |
| Dispersion 3 | 118 nm | 0.75 | 150 |
| Dispersion 4 | 120 nm | 0.87 | 150 |
| Dispersion 5 | 132 nm | 0.82 | 160 |
| Dispersion 6 | 126 nm | 0.95 | 160 |
| Dispersion 7 | 83 nm | 1.05 | 160 |
| Dispersion 8 | 92 nm | 1.26 | 160 |
| Dispersion 9 | 91 nm | 1.42 | 160 |

Example 1

Dispersion 7 was diluted with deionized water to provide a sample containing 8% pigment solids and balance water.

Example 2

Dispersion 8 was diluted with deionized water to provide a sample containing 8% pigment solids and balance water.

Example 3

Dispersion 9 was diluted with deionized water to provide a sample containing 8% pigment solids and balance water.

Comparative Example 1

Dispersion 1 was diluted with deionized water to provide a sample containing 8% pigment solids and balance water.

Comparative Example 2

Dispersion 2 was diluted with deionized water to provide a sample containing 8% pigment solids and balance water.

Comparative Example 3

Dispersion 3 was diluted with deionized water to provide a sample containing 8% pigment solids and balance water.

Comparative Example 4

Dispersion 4 was diluted with deionized water to provide a sample containing 8% pigment solids and balance water.

Comparative Example 5

Dispersion 5 was diluted with deionized water to provide a sample containing 8% pigment solids and balance water.

Comparative Example 6

Dispersion 6 was diluted with deionized water to provide a sample containing 8% pigment solids and balance water.

Procedure to Determine the Pigment Densification Rate of the Pigment Dispersion

Sample solutions containing exactly equal 8% pigment with the balance being mostly water were prepared for the test. A volume of 10 mL of each sample was loaded into a Miniplus Static Concentrator, Part No. 9061 (from Millipore Corporation, Billerica, Mass.). Over time, the sample decreased in volume due to the removal of water through the membrane. The amount of pigment lost through the membrane is minimal. The pigment concentration can be further confirmed gravimetrically or by UV-Vis absorption. The overwhelming amount of volume lost is water and cosolvents from the sample. Thus the percent pigment concentration can be determined by dividing the original amount of pigment weight by the remaining volume. A reduction in half the volume equals the increase in pigment concentration by a factor of two. The time taken for reduction to half the volume of liquid to the 5 mL mark was noted. The densification rate was calculated by dividing the volume loss (5 mL) by the time.

The pigment densification rate for samples as prepared in Examples 1-3 and Comparative Examples 1-6 were determined and results are shown in Table 2.

TABLE 2

| | Time for 50% Reduction in Sample Volume | Rate of Pigment Densification (milliliters per second) | Densification Rate Increase Compared to Example 1 |
|---|---|---|---|
| Example 1 | 116 min | 7.18E−04 | |
| Example 2 | 115 min | 7.25E−04 | 1% |
| Example 3 | 110 min | 7.58E−04 | 5% |
| Comparative Example 1 | 87 min | 9.58E−04 | 33% |
| Comparative Example 2 | 92 min | 9.09E−04 | 26% |
| Comparative Example 3 | 95 min | 8.74E−04 | 22% |

TABLE 2-continued

| | Time for 50% Reduction in Sample Volume | Rate of Pigment Densification (milliliters per second) | Densification Rate Increase Compared to Example 1 |
|---|---|---|---|
| Comparative Example 4 | 85 min | 9.86E−04 | 37% |
| Comparative Example 5 | 89 min | 9.42E−04 | 31% |
| Comparative Example 6 | 99 min | 8.45E−04 | 18% |

Example Ink A

An ink was made combining 62.5 parts of Example 1 with 6 parts 2-pyrollidone, 5 parts Liponic®-EG, 7 parts 1,5-pentanediol, and water to a total of 100 parts.

Comparative Example Ink B

An ink was made combining 62.5 parts of Comparative Example 4 with 6 parts 2-pyrollidone, 5 parts Liponic®-EG, 7 parts 1,5-pentanediol, and water to a total of 100 parts.

Comparative Example Ink C

An ink was made combining 62.5 parts of Comparative Example 5 with 6 parts 2-pyrollidone, 5 parts Liponic®-EG, 7 parts 1,5-pentanediol, and water to a total of 100 parts.

What is claimed is:

1. A self dispersing pigment dispersion for use in inks comprising a pigment having a stabilizing group covalently attached to the pigment surface, and having an oil adsorption of at least about 155 to about 179 mL/100 g, and an acid content of at least about 0.98 microquivalent/m$^2$, and wherein the pigment dispersion has a pigment densification rate of less than about 8.40 E-04 mL/second.

2. The self dispersing pigment dispersion of claim 1 wherein the stabilizing group is selected from the group consisting of —COOM, —SO$_3$M, —PO$_3$M$_2$, and —SO$_2$NH$_2$, wherein M is H, alkaline metal, ammonium or organic ammonium.

3. The self dispersing pigment dispersion of claim 2 wherein the stabilizing group is —COOM wherein M is H, alkaline metal, ammonium or organic ammonium.

4. The self dispersing pigment dispersion of claim 3 wherein the stabilizing group is —COOM, wherein M is an alkaline metal.

5. The self dispersing pigment dispersion of claim 1 wherein the pigment has oil absorption of at least about 160 to about 170 mL/100 g.

6. The self dispersing pigment dispersion of claim 5 wherein the pigment has oil absorption of at least about 160 to about 165 mL/100 g.

7. The self dispersing pigment dispersion of claim 1 wherein the pigment has an acid content of about 0.98 to about 3.0 microequivalent/m$^2$.

8. The self dispersing pigment dispersion of claim 7 wherein the pigment has an acid content of about 0.98 to about 2.0 microequivalent/m$^2$.

9. The self dispersing pigment dispersion of claim 8 wherein the pigment has an acid content of about 0.98 to about 1.5 microequivalent/m$^2$.

10. The self dispersing pigment dispersion of claim 1 wherein the stabilizing group covalently attached to the pigment surface of the pigment is obtained by oxidizing the pigment.

11. The self dispersing pigment dispersion of claim 10 wherein the pigment surface is oxidized with ozone.

12. The self dispersing pigment dispersion of claim 10 wherein the pigment surface is oxidized with ozone in an aqueous environment while simultaneously subjecting the pigment to at least one dispersive mixing operation.

13. The self dispersing pigment dispersion of claim 1 wherein the pigment is a carbon black pigment.

14. The self dispersing pigment dispersion of claim 1 wherein the pigment dispersion has a pigment densification rate of less than 7.80 E-04 mL/second.

15. An ink comprising an aqueous carrier medium, a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/m$^2$, and wherein the pigment dispersion has a pigment densification rate of less than about 8.40 E-04 mL/second.

16. The ink of claim 15 wherein the ink is an aqueous ink jet ink.

17. The ink jet ink of claim 16 wherein the stabilizing group is selected from the group consisting of —COOM, —SO$_3$M, —PO$_3$M$_2$, and —SO$_2$NH$_2$, wherein M is H, alkaline metal, ammonium or organic ammonium.

18. The ink jet ink of claim 16 wherein the pigment has oil absorption of at least about 160 to about 170 mL/100 g.

19. A method of ink jet printing onto a substrate comprising, in any workable order, the steps of:
(a) providing an ink jet printer that is responsive to digital data signals;
(b) loading the printer with a substrate to be printed;
(c) loading the printer with an aqueous ink jet ink comprising an aqueous carrier medium and a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/m$^2$, and wherein the pigment dispersion has a pigment densification rate of less than about 8.40 E-04 mL/second; and
(d) printing onto the substrate using the aqueous ink jet ink, in response to the digital data signals to form a printed image on the substrate.

20. A printer comprising an ink jet ink, wherein the ink jet ink comprises an aqueous carrier medium and a self dispersing pigment dispersion, wherein the self dispersing pigment dispersion comprises a pigment having a stabilizing group covalently attached to the pigment surface, and having an oil adsorption of at least about 155 to about 179 mL/100 g, and an acid content of at least about 0.98 microequivalent/m$^2$, and wherein the pigment dispersion has a pigment densification rate of less than about 8.40 E-04 mL/second.

* * * * *